United States Patent
Zhang et al.

(10) Patent No.: US 7,502,312 B2
(45) Date of Patent: *Mar. 10, 2009

(54) FOURIER-TRANSFORM BASED LINEAR EQUALIZATION FOR CDMA DOWNLINK

(75) Inventors: Jianzhong Zhang, Irving, TX (US); Tejas Bhatt, Farmers Branch, TX (US); Giridhar Mandyam, Plano, TX (US)

(73) Assignee: Nokia Corporation, Espoo (FI)

( * ) Notice: Subject to any disclaimer, the term of this patent is extended or adjusted under 35 U.S.C. 154(b) by 685 days.

This patent is subject to a terminal disclaimer.

(21) Appl. No.: 11/030,662

(22) Filed: Jan. 5, 2005

(65) Prior Publication Data

US 2005/0117532 A1 Jun. 2, 2005

Related U.S. Application Data

(63) Continuation of application No. 10/436,618, filed on May 13, 2003, now Pat. No. 6,873,596.

(51) Int. Cl.
*H04J 11/00* (2006.01)

(52) U.S. Cl. .................. 370/210; 370/342; 375/142

(58) Field of Classification Search .............. None
See application file for complete search history.

(56) References Cited

U.S. PATENT DOCUMENTS

| | | | | |
|---|---|---|---|---|
| 5,209,237 A * | 5/1993 | Rosenthal | .................. | 600/511 |
| 5,343,496 A | 8/1994 | Honig et al. | .................. | 375/1 |
| 5,353,300 A | 10/1994 | Lee et al. | .................. | 375/1 |
| 5,623,484 A | 4/1997 | Muszynski | .................. | 370/335 |
| 5,831,984 A | 11/1998 | Hottinen | .................. | 370/441 |
| 6,061,327 A * | 5/2000 | Demoulin et al. | .................. | 370/208 |
| 6,532,254 B1 | 3/2003 | Jokinen | .................. | 375/148 |
| 6,608,859 B2 * | 8/2003 | De et al. | .................. | 375/147 |
| 6,625,203 B2 * | 9/2003 | De et al. | .................. | 375/147 |
| 6,879,578 B2 * | 4/2005 | Pan et al. | .................. | 370/342 |
| 6,885,654 B2 * | 4/2005 | Pan et al. | .................. | 370/342 |
| 6,904,036 B2 * | 6/2005 | Pan et al. | .................. | 370/342 |
| 2001/0033614 A1 * | 10/2001 | Hudson | .................. | 375/229 |
| 2003/0043767 A1 * | 3/2003 | Pan et al. | .................. | 370/335 |
| 2003/0125090 A1 | 7/2003 | Zeira | .................. | 455/562 |
| 2003/0185295 A1 * | 10/2003 | Yousef | .................. | 375/233 |
| 2004/0012525 A1 * | 1/2004 | Yuda et al. | .................. | 342/417 |

OTHER PUBLICATIONS

"Kronecker Products and Matrix Calculus In System Theory", Brewer, John W., IEEE Transactions On Circuits And Systems, vol. CAS 25, No. 9, Sep. 1978, pp. 772-781.

(Continued)

*Primary Examiner*—Bob A Phunkulh
(74) *Attorney, Agent, or Firm*—Harrington & Smith, PC

(57) ABSTRACT

In the reception of a CDMA signal, the receiving unit performs a simplified process of linear equalization that eliminates the need for inverting the correlation matrix. For the single antenna reception case, the correlation matrix is approximated to a good degree by a circulation matrix that is diagonalized by FFT operations, thus substituting two FFTs and one IFFT having a complexity of $O(3/2\ L_F \log L_F)$ for the direct matrix inversion having a complexity of $O(L_F^3)$. The extension of this method uses a multiple antenna reception system with oversampling.

40 Claims, 7 Drawing Sheets

OTHER PUBLICATIONS

"Downlink Channel Decorrelation in CDMA Systems With Long Codes", Werner, Stefan, et al., IEEE 1999, pp. 1614-1617.

"Low-Complexity Implementation Of CDMA Downlink Equalization", Mailaender, L., IEEE, RG Mobile Communication Technologies, Mar. 2001, pp. 396-400.

"Data Detection Algorithms Specially Designed For The Downlink Of CDMA Mobile Radio Systems", Klein, Anja, IEEE, 1997, pp. 203-206.

"MMSE Equalization For Forward Link In 3G CDMA: Symbol-Level Versus Chip-Level", Krauss, Thomas P., et al., IEEE 2000, pp. 18-22.

"A Novel Blind Adaptive Algorithm for Channel Equalization in WCDMA Downlink", Heikkila, Markku J., et al., IEEE 2001, pp. 4-41-4-45.

"Interference Suppression in CDMA Downlink through Adaptive Channel Equalization", Heikkila, Markku J., et al., 5 pages.

"Linear Receivers for the DS-CDMA Downlink Exploiting Orthogonality of Spreading Sequences", Ghauri, Irfan, et al., IEEE 1998, pp. 650-654.

"Fast Positive Definite Linear System Solvers", Tewfik, A. H., IEEE Transactions On Signal Processing, vol. 42, No. 3, Mar. 1994, pp. 572-585.

"Novel Frequency-Domain Equalization Architectures for a Single-Carrier Wireless MIMO System", Xu Zhu et al., IEEE 2002, pp. 874-878.

"Frequency Domain Adaptive Equalization for MIMO Sytems", Hai Huyen Dam, et al., IEEE 2003, pp. 443-446.

"Efficient MIMO Equalization for Downlink Multi-Code CDMA: Complexity Optimization and Comparative Study", Yanbin Guo et al., IEEE 2004, pp. 2513-2519.

* cited by examiner $$d(i) = c(i) \sum_{k=1}^{K} \sum_{m} a_k b_k(m) s_k(i-mG) \quad (1)$$

$$r(i) = H(i)d(i) + n(i) = \begin{bmatrix} h_0 & \cdots & h_L & & \\ & h_0 & & h_L & \\ & & \ddots & & \ddots \\ & & & h_0 & \cdots & h_L \end{bmatrix} \begin{bmatrix} d(i+F) \\ \vdots \\ d(i) \\ \vdots \\ d(i-F-L) \end{bmatrix} + n(i) \quad (2)$$

$$R_{rr}(i) = E[r(i)r^H(i)] = H(i)E[d(i)d^H(i)]H(i)^H + \sigma_n^2 I \quad (3)$$

$$w^{opt} = \sigma_d^2 R_{rr}^{-1} h = (\sigma_d^2 HH^H + \sigma_n^2 I)^{-1} h \quad (4)$$

$$R_{rr} = \begin{bmatrix} r_0 & \cdots & r_L^* & & 0 \\ \vdots & \ddots & & \ddots & \\ r_L & & \ddots & & r_L^* \\ & \ddots & & \ddots & \vdots \\ 0 & & r_L & \cdots & r_0 \end{bmatrix} \quad (5)$$

$$r_l = \sigma_d^2 \sum_{i=0}^{L} h_i h_{i-l} + \delta_l \sigma_n^2, \quad l = 0, \ldots, L \quad (6)$$

$$S = R_{rr} + \begin{bmatrix} 0 & 0 & C_L \\ 0 & 0 & 0 \\ C_L^H & 0 & 0 \end{bmatrix} \quad (7)$$

$$C_L = \begin{bmatrix} r_L & \cdots & r_1 \\ & \ddots & \vdots \\ 0 & & r_L \end{bmatrix} \quad (8)$$

| FIG.8a |
|--------|
| FIG.8b |

FIG.8

FIG.8a $$D = \frac{1}{\sqrt{L_F}} \begin{bmatrix} 1 & 1 & \cdots & 1 \\ 1 & e^{-j(2\pi/L_F)} & & e^{-j(2\pi/L_F)(L_F-1)} \\ \vdots & & & \\ 1 & e^{-j(2\pi/L_F)(L_F-1)} & \cdots & e^{-j(2\pi/L_F)(L_F-1)^2} \end{bmatrix} \quad (9)$$

$$V = \begin{bmatrix} 0 & 0 & C_L \\ J_L & 0 & 0 \end{bmatrix} \quad (10)$$

$$R_{rr} = \begin{bmatrix} E_0 & \cdots & E_L^H & & 0 \\ \vdots & \ddots & & \ddots & \\ E_L & & \ddots & & E_L^H \\ & \ddots & & \ddots & \vdots \\ 0 & & E_L & \cdots & E_0 \end{bmatrix} \quad (11)$$

$$E_l = \sigma_d^2 \sum_{i=0}^{L} h_i h_{i-l}^H + \delta_L \sigma_n^2, \quad l = 0, \ldots, L \quad (12)$$

$$P = \begin{bmatrix} 0 & 1 \\ 1 & 0 \end{bmatrix} \quad (13)$$

$$S = I \otimes E_0 + P \otimes E_1 + \ldots + P^{L_F-1} \otimes E_{L_F-1} \quad (14)$$

$$S = \underbrace{(D^H \otimes I)}_{15-1} \underbrace{\left(\sum_{i=0}^{L_F-1} W^i \otimes E_i\right)}_{15-2} \underbrace{(D \otimes I)}_{15-3} \quad (15)$$

$$F = \sum_{i=0}^{L_F-1} W^i \otimes E_i = \begin{bmatrix} F_0 & & 0 \\ & \ddots & \\ 0 & & F_{L_F-1} \end{bmatrix} \quad (16)$$

$$F_k = \sum_{i=0}^{L_F-1} W^{-i \cdot k} \otimes E_i, \quad k=0, \ldots, L_F-1 \quad (17)$$

$$S^{-1} = (D^H \otimes I) F^{-1} (D \otimes I) \quad (18)$$

FIG.8b

FOURIER-TRANSFORM BASED LINEAR EQUALIZATION FOR CDMA DOWNLINK

PRIORITY STATEMENT

This application is a continuation of U.S. patent application Ser. No. 10/436,618, filed on May 13, 2003 now U.S. Pat. No. 6,873,596, and claims benefit thereof under 35 U.S.C. § 120.

FIELD OF THE INVENTION

The invention relates to a reception method in mobile CDMA telephone systems Wherein a received signal is separated from other interfering signals by means of a linear equalization algorithm that avoids matrix inversion.

BACKGROUND OF THE INVENTION

A central problem in designing and implementing a data transmission system is simultaneous transmission and reception of signals from several simultaneous users such that the signals interfere with one another as little as possible. Because of this and the transmission capacity used, various transmission protocols and multiple access methods have been used, the most common especially in mobile phone traffic being FDMA (Frequency Division Multiple Access) and TDMA (Time Division Multiple Access), and recently CDMA (Code Division Multiple Access).

CDMA is a multiple access method based on a spread spectrum technique, and it has been recently put into use in cellular radio systems in addition to previously used FDMA and TDMA. CDMA has many advantages over the prior methods, such as simplicity of frequency planning, and spectrum efficiency.

In a CDMA method, a narrow-band data signal of a user is multiplied to a relatively broad band by a spreading code having a much broader band than the data signal. Band widths used in known test systems include e.g. 1.25 MHz, 10 MHz and 25 MHz. The multiplication spreads the data signal over the entire band to be used. All the users-transmit simultaneously on the same frequency band. A different spreading code is used on each connection between a base station and a mobile station, and the signals of the users can be distinguished from one another in the receivers on the basis of the spreading code of the user. If possible, the spreading codes are selected in such a way that they are mutually orthogonal, i.e. they do not correlate with one another.

Correlators in conventionally implemented CDMA receivers are synchronized with a desired signal, which they recognize on the basis of the spreading code. In the receiver the data signal is restored to the original band by multiplying it by the same spreading code as in the transmission step. Ideally, the signals that have been multiplied by some other spreading code do not correlate and are not restored to the narrow band. In view of the desired signal, they thus appear as noise. The object is to detect the signal of the desired user from among a number of interfering signals. In practice, the spreading codes do correlate to some extent, and the signals of the other users make it more difficult to detect the desired signal by distorting the received signal. This interference caused by the users to one another is called multiple access interference.

The situation is especially problematic when one or several users transmit with a considerably greater signal strength than the other users. These users employing greater signal strength interfere considerably with the connections of the other users. Such a situation is called a near-far problem, and it may occur for example in cellular radio systems when one or several users are situated near the base station and some users are further away, whereupon the users that are situated closer blanket the signals of the other users in the base station receiver, unless the power control algorithms of the system are very fast and efficient.

The reliable reception of signals is problematic especially in asynchronous systems, i.e. systems where the signals of the users are not synchronized with one another, since the symbols of the users are disturbed by the several symbols of the other users. In conventional receivers, filters matched with the spreading codes, and sliding correlators, which are both used as detectors, do not function well in near-far situations, however. Of the known methods the best result is provided by a decorrelating detector, which eliminates multiple access interference from the received signal by multiplying it by the cross-correlation matrix of the spreading codes used. The decorrelating detector is described in greater detail in Lupas, Verdu, Linear multiuser detectors for synchronous code-division multiple access channels, IEEE Transactions on Information Theory, Vol. 35, No. 1, pp. 123-136, January 1989; and Lupas, Verdu, Near-far resistance of multiuser detectors in asynchronous channels, IEEE Transactions on Communications, Vol. 38, April 1990. These methods, however, also involve many operations, such as matrix inversion operations, that require a high calculating capacity and that are especially demanding when the quality of the transmission channel and the number of the users vary constantly, as for example in cellular radio systems.

Channel equalization is a promising means of improving the downlink receiver performance in a frequency selective CDMA downlink. Current research encompasses two types of linear equalization, namely non-adaptive linear equalization and adaptive linear equalization. Non-adaptive linear equalizers usually assume "piece-wise" stationarity of the channel and design the equalizer according to some optimization criteria such as LMMSE (Least Minimum Mean Squared Error) or zero-forcing, which in general leads to solving a system of linear equations by matrix inversion. This can be computationally expensive, especially when the coherence-time of the channel is short and the equalizers have to be updated frequently. On the other hand, adaptive algorithms solve the similar LMMSE or zero-forcing optimization problems by means of stochastic gradient algorithms and avoid direct matrix inversion. Although computationally more manageable, the adaptive algorithms are less robust since their convergence behavior and performance depend on the choices of parameters such as step size.

The art still has need of an equalization procedure that is robust and does not consume a great deal of computation power.

SUMMARY OF THE INVENTION

The purpose of the present invention is to provide an equalization method for downlink CDMA signals that avoids a computationally intense matrix inversion.

A feature of the invention is a linear filter process using only FFTs and IFFTs as steps in the filter coefficient generation process.

A feature of the invention is the approximation of the correlation matrix with a circulant matrix that is diagonalized by a DFT operation.

BRIEF DESCRIPTION OF THE DRAWINGS

FIG. 8 shows various equations used in the analysis of the invention.

BEST MODE OF CARRYING OUT THE INVENTION

Figure 1:
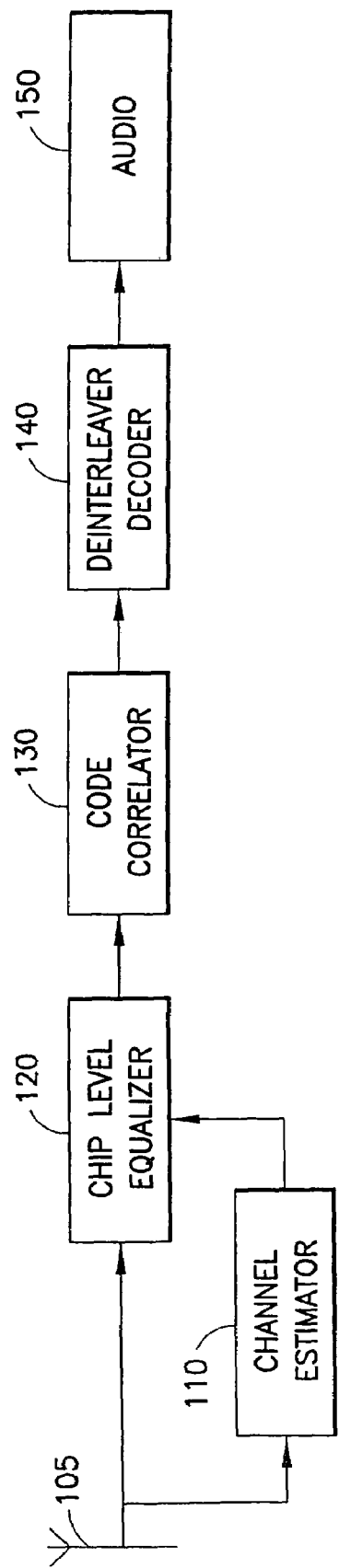
FIG. 1 shows a block diagram of a receiver using the invention.

In the case of a CDMA downlink with J active users each is assigned a number of codes $K_j$; for j=1--J. Let K be the total number of active spreading codes (summed over J). Note that in our discussion, we use spreading code index, rather than user index, to simplify the notation. At the transmitter, the chip-level signal representation is given by Eq (1) in FIG. 8, where i, m and k are chip, symbol and spreading code indices. The base station scrambling code is denoted by c(i). Meanwhile, $a_k$ stands for the power assigned to spreading code k, $b_k$ is the information symbol sequence for spreading code k and $s_k(i)$ is the spreading code k.

Let $h=[h_0; \ldots; h_L]$ be the composite chip-level channel impulse vector of spreading code k. Note h includes the contributions from transmit pulse shaper, the wireless propagation channel and the receive filter, so that it will change as the environment changes. Also note that since we only consider spreading code k throughout our discussion, we use h instead of $h_k$ for clarity. The matrix-vector representation of the received signal is given in equation 2 in FIG. 8. To facilitate the discussion of linear equalization, we stack F+1 chips in the received vector r so that $r(i)=[r(i+F); \ldots; r(i); \ldots; r(i-F)]^T=H(i)d(i)+n(i)$, where $d(i)=E[d(i)d^H(i)]$ is the transmitted chip power and h(i) is the (F+1)th column in H(i). The solution in this form is not desirable, since it depends on the chip index i and is time-varying. However, the dependence on i can be removed if the following two assumptions hold:

a) The channel vector h(i) is stationary over a large block of chips. This condition is satisfied by choosing the block size such that the time span of the block is a small fraction of the channel coherence time. With this condition, the dependence on i is removed from h(i) and H(i).

b) The chip-level transmitted signal d(i) is white and wide sense stationary. It can be shown that this condition is strictly satisfied if the system is fully loaded, i.e, when K=G, and each spreading code is assigned equal power. Otherwise, this condition holds reasonably well except for very lightly loaded systems, i.e, when K <<G. The following solution is thus counterintuitive, since it is better at small signal to noise ratios than when the conditions are conventionally "better"; i.e. a signal stands out cleanly from the background.

Removing the dependence on time, the solution to the filter vector w becomes Equation 4 in FIG. 8, where sigma is a constant representing the transmitted power, and R is the correlation matrix from Eq 3. Those skilled in the art will be aware that the estimated data after equalization are represented by $d(i)=w^H r(i)$, where r is the received signal in Equation 2 and w is relatively slowly varying. It has been observed that, as shown in Eq 5, that R is banded Toeplitz in form, with individual elements given by Eq 6 that depend on the channel impulse vector h and some constants.

Those skilled in the art are aware that the analytic solution for w to the previous problem (expressing w in terms of other observed parameters) requires inverting the correlation matrix R. The inversion calculation requires computational resources and time. Providing the required computation resources in a mobile telephone handset is difficult, as is performing the calculations with limited hardware resources quickly enough to provide a satisfactory solution. Thus, the invention is well adapted to use in the receiver of a mobile handset in a CDMA cellular system.

The complexity of the matrix inversion is of the order of $L_F^3$, where $L_F=2 F+1$ is the filter length. Further, the matrix inversion operation can be numerically unstable and inaccurate in the frequent case of fixed-point implementations.

It is an advantageous feature of the invention that matrix inversion is avoided by a process in which matrix inversion is replaced by Fourier transforms. In the preferred embodiment of the invention, the inversion of the correlation matrix is replaced by two FFTs (Fast Fourier Transform) and an inverse FFT.

If $L_F > 2 L$, we can convert R into a circulant matrix S by the addition of a matrix C according to Eq 7, where C is an upper triangular "corner" matrix defined in Eq 8. The purpose of this change is to take advantage of the property that every circulant matrix can be diagonalized by a DFT (Discrete Fourier Transform) matrix, i.e. $S=D^H(\Lambda) D$, where D is defined in Eq 9 and $\Lambda$ is a diagonal matrix that is obtained by taking a DFT on the first column of S.

Defining V according to Eq 10, those skilled in the art will appreciate that the problem of inverting the $L_F \times L_F$ matrix R has been reduced to inverting the 2 L×2 L matrix $J_{2L} - VS^{-1} V^H$, where $J_{2L}$ is a 2 L×2 L "exchange" matrix (ones on anti-diagonals).

Further, if the filter length is much longer than the channel correlation length, i.e. $L_F >> 2 L$, then adding the two corners to the correlation matrix R does not significantly change the eigenstructure of the matrix. Accordingly, the inverse of R is approximately equal to the inverse of S. Therefore no direct matrix inversion is necessary since the inverse of S can be obtained with some FFT and IFFT operations.

Returning to the problem of isolating the desired signal, the solution becomes $w=S^{-1}h=D^H(\Lambda)^{-1}Dh$, where the D and $D^H$ operations represent DFT and IDFT operations, respectively. As yet another simplification, the DFT operations can be replaced by computationally simpler FFT operations.

The signal recognition process then becomes:
1) Estimate the correlation matrix R from the received signal;
2) Convert R to the circulant matrix S by adding the two corner matrices;
3) Take FFT(s), where s is the first column of S and generate $\Lambda$;
4) Calculate Dh=FFT(h) and $(\Lambda)^{-1}Dh$, and
5) Transform back into the time domain where $w=D^H(\Lambda)^{-1}Dh=IFFT((\Lambda)^{-1}Dh)$;
6) Apply the resulting w to the received vector r to calculate the estimated chip d.

The elements of the quantity $(\Lambda)^{-1}Dh$ will also be referred to as the frequency domain filter taps. The estimated chip d is then processed conventionally to generate the analog voice signal (or data).

Since the filter is unchanged for a block of N chips, the calculation iS load per chip is normalized by N. N may be, illustratively, 1024. The overall per-chip complexity then becomes of order $(L_F+(3\ L_F/2N) \log 2\ L_F)$, which compares favorably with the complexity of order $(L_F+(1/N)L_F^3)$ for the direct matrix inversion method.

Referring now to FIG. 1, there is shown a block diagram of a receiver according to the invention, illustratively a mobile handset in a cellular CDMA system, in which antenna 105 receives incoming signals, which pass to channel estimator 110, which generates an initial estimate for parameters used in the calculations, and also passes to equalizer 120, which represents the circuits that perform the various calculations discussed below. In this algorithm, the process of estimating the correlation matrix elements is performed according to any convenient conventional method such as illustrated in the book "Statistical Signal Processing" by Louis Scharf, Addison Wesley. The calculations may be carried out in a special-purpose device, including a digital signal processor chip and/or a general purpose device such as a microprocessor. The instructions for carrying out the process may be stored in any convenient medium, e.g. a read-only memory chip readable by a machine.

The function of the equalizer is to partially or largely restore the orthogonality of the separate spreading codes representing the various "channels", one for each user.

After the equalizer, a conventional code correlator, as known to those skilled in the art, such as that shown in the book "Digital Communications" by John Proakis, McGraw Hill, separates out the power associated with the particular code that is carrying the data of interest. A conventional deinterleaver selects the particular data of interest. Box 150, labeled Audio, represents schematically the conventional circuits that convert the digital signals processed up to this point to analog audio, (or in the case of data, pass the data on to the next step). For convenience in expressing the claims, the signal leaving the deinterleaver 140 will be referred to as the output signal and the processes represented by box 150 (summing a block of data, performing digital to analog conversion, smoothing, amplifying, etc.) will be referred to as processing the output signal.

Figure 2:
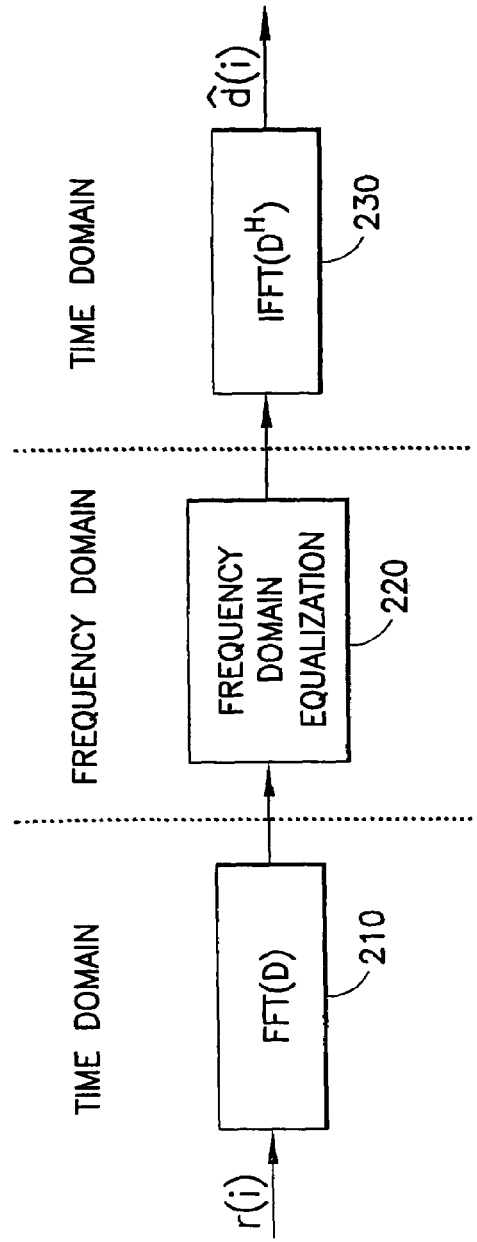
FIG. 2 shows a diagram of the equalization process using the frequency domain interpretation.

FIG. 2 illustrates an approach to the problem of equalization that is conceptually clear, though it does not offer the computational advantages of the preferred embodiments. Block 210 represents a Fourier transform that is applied to each chip from the time domain to the frequency domain. Block 220 represents equalization calculations analogous to the linear equalization processes discussed above to calculate the inverse of $\Lambda$. Block 230 then represents the inverse Fourier transform back to the time domain. Since this approach requires a DFT for every chip, the complexity is of order $(L_F+(\frac{1}{2})L_F\log 2\ L_F+(L_F/N)\log 2\ L_F)$, which is greater than other approaches, though still favorable compared with direct inversion.

Numerical Calculation Techniques

Two calculation techniques have been found to improve the accuracy of the approximation used and the stability of the results. Adding an artificial noise floor to the matrix S by adding a unit matrix multiplied by a small constant prevents dividing by a small number when the eigenvalues of the matrix are used as divisors in the FFT. This is equivalent to assuming that the noise is worse than it really is.

In addition, since the length of the impulse vector h is a constant fixed by the channel profile, we can improve the accuracy of the approximation by increasing the filter length $L_F$. This has the effect of reducing inaccuracies introduced by adding in the corner matrix CL when the eigenvalues are calculated. Since increasing the filter length means higher filter complexity, a better tradeoff is provided by using a double length ($2\ L_F$) vector while performing calculations in the frequency domain. The initial set of chips in the received vector is expanded to length $2\ L_F$. This expanded vector is transformed to the Fourier domain and used for calculations. After the inverse Fourier Transform, the extra $L_F/2$ taps on the two sides are truncated and only the $L_F$ taps in the center are used.

Figure 3:
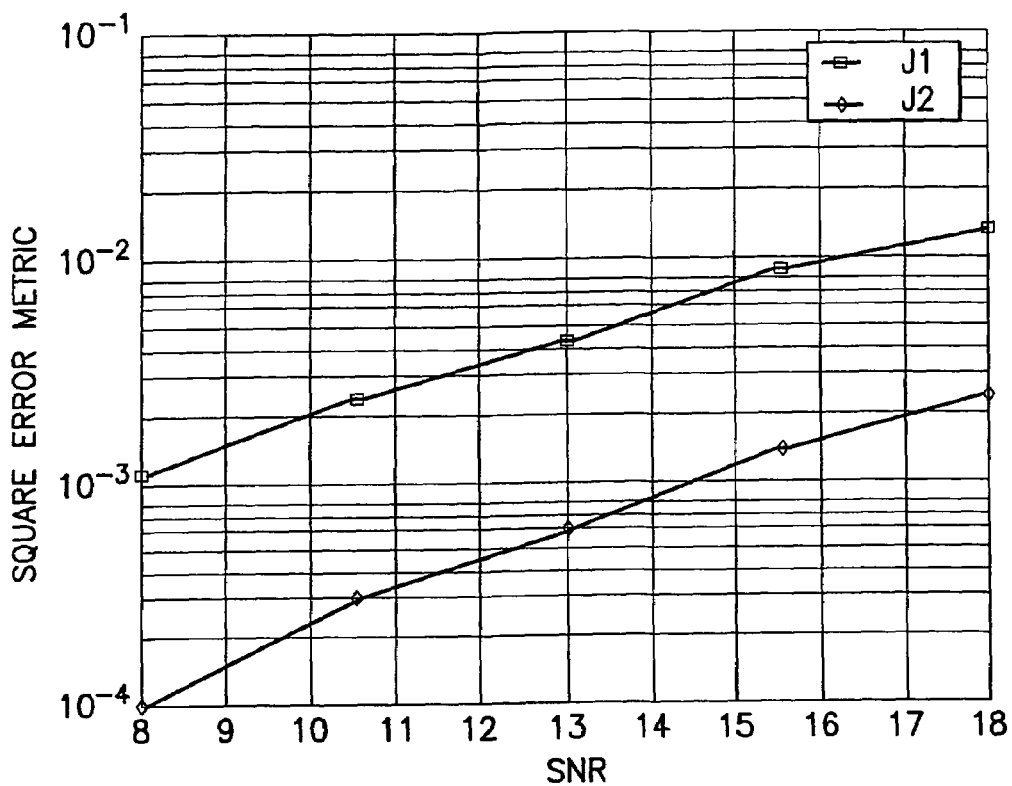
FIG. 3 shows the result of a numerical simulation of error metrics for alternative processes.

FIG. 3 shows a comparison of numerical simulations in a wideband CDMA system, averaged over a large number of simulation blocks, of the difference squared between the solution w of the direct matrix inversion and a filter of length $L_F$: $J1=(Winv-WF)^2$ and a corresponding squared difference for the expanded filter used in the frequency domain $J2=(Winv-W2\ F)^2$, where Winv is the solution for w of the direct matrix inversion, 2F is the corresponding solution from the above for a filter of length $L_F$ and W2 F is the corresponding solution for a filter of length 2 F in the Fourier domain. As can be seen, the expanded technique produces much lower error rates. The increase in error rate at higher signal to noise ratios is a consequence of the use of Fourier techniques.

Figure 5:
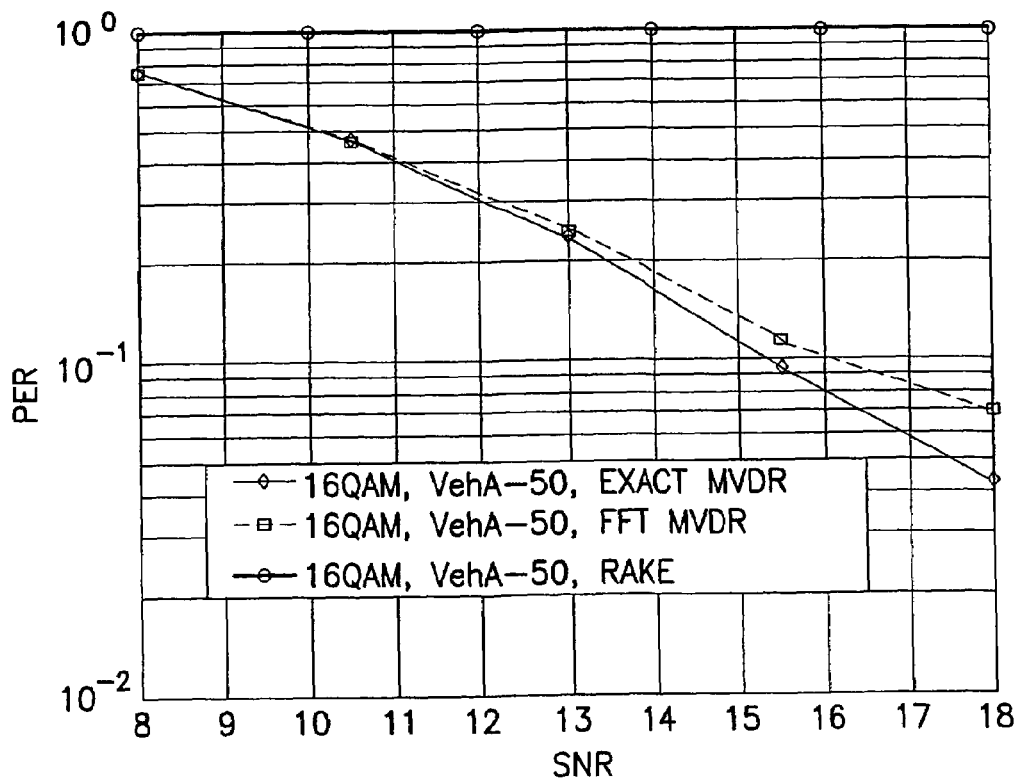
FIG. 5 shows the comparison of FIG. 4 for a different embodiment.
Figure 4:
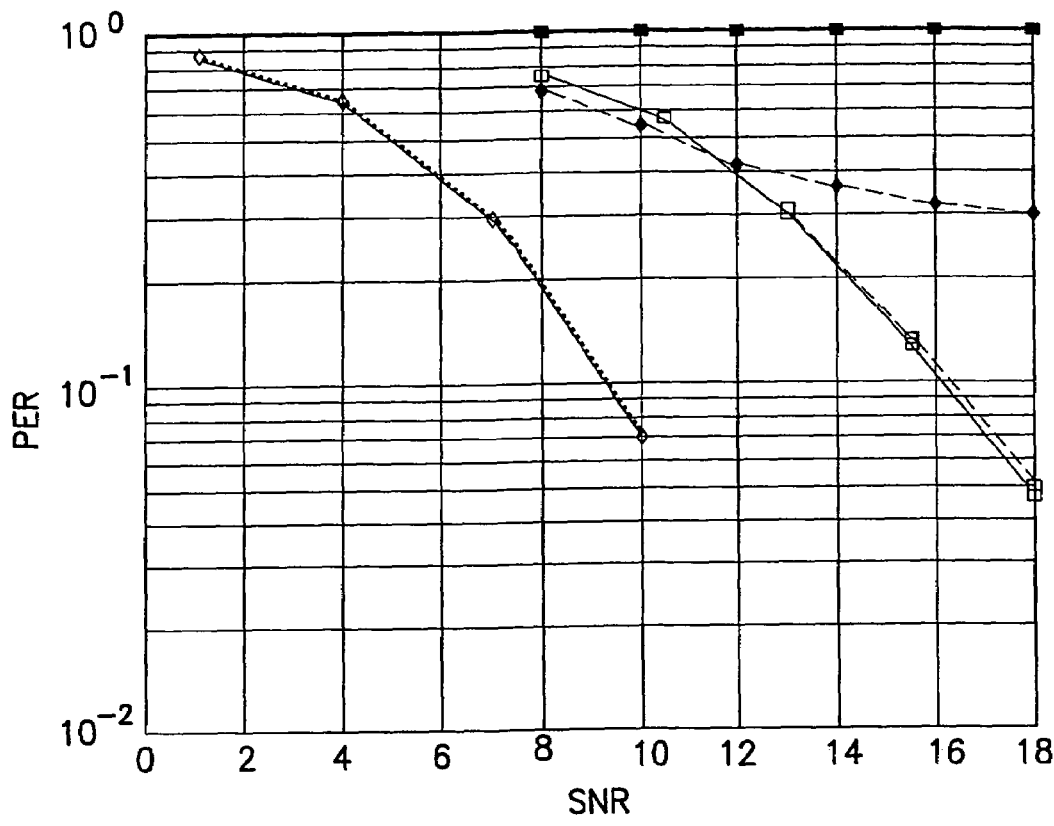
FIG. 4 shows a comparison of error rates between the inventive process with an exact solution.

FIGS. 4 and 5 show simulation results for a single data channel using the following parameters:

TABLE 1

| Parameter Name | Parameter Value |
| --- | --- |
| Total HS-DSCH power | 70 percent |
| CPICH Power | 10 percent |
| SCH power | 10 percent (off) |
| Carrier frequency | 2 GHz |
| HS-DSCH (data channel) spreading factor | 16 |
| CPICH (pilot channel) spreading factor | 256 |
| Filter Length, $L_F$ | 32 |
| Channel estimate | Ideal |

Where HS-DSCH Power is the power allocated to the High Speed Downlink Shared Control Channel, that is the percentage of the total available power that is allocated to the base station; SCH power is the power allocated to Synchronization channels, which includes both Primary Synchronization Channel (P-SCH) and Secondary Synchronization Channel (S-CH). The SCH power is divided equally among P-SCH and S-SCH; and CPICH is the Common Pilot CHannel.

The following three cases were used as models:

TABLE 2

|  | QPSK, PedB-3 | 16 QAM, PedB-3 | 16 QAM, VehA-50 |
| --- | --- | --- | --- |
| Channel model | Pedestrian B | Pedestrian B | Vehicular A |
| Mobile speed | 3 km/h | 3 km/h | 50 km/h |
| Turbo code rate | 0.6 | 0.5617 | 0.5617 |
| No. of codes | 10 | 8 | 8 |
| Data rate | 2.8 Mbps | 4.2 Mbps | 4.2 Mbps |

Multi-Channel Diversity

Multi-channel diversity reception is an important means of improving receiver performance. The benefit of diversity reception is two-fold: first, the outage probability is reduced since the chance that all the diversity branches experience deep fade is smaller; second, the added diversity branches provide additional signal dimension that can be used in enhancing the SNR, suppressing the ISI and MAI, etc.

Multi-channel diversity reception manifests itself in many forms. Among them, oversampling, multiple receive antennas, and antenna polarization are the most commonly used.

The performance of these methods depends on the statistical correlation between different diversity branches. In general, the smaller the correlation between different diversity branches the better the overall receiver performance.

In this section, we extend our FFT based linear equalization method to systems with diversity receptions. The following treatment does not distinguish between different diversity methods since they all share the same mathematical form. To this end, let M denote the total number of diversity branches (typically 2 or 4) and we extend the received signal model of eq 2 by substituting a small vector $h_i$ for the scalar $h_i$ of the previous discussion.

The correlation matrix is again banded block Toeplitz, with the change that the elements are now small matrices, as shown in eq 11 and 12. The problem of solving the matrix equation for the signal vector w is made more complex because the correlation matrix R is now $ML_F \times ML_F$ and correspondingly more difficult to invert directly.

The procedure of the previous section is followed by approximating the block Toeplitz matrix R with a block circulant matrix S. In order to invert S, we introduce a cyclic shift matrix P according to eq 13, where I is the identity matrix. S, then, can be represented as eq 14, where the symbol $\otimes$ denotes a Kronecker product and $E_0\text{--}E_{LF-1}$ form the first "block" column in matrix S. Proceeding analogously to the previous discussion, P may be diagonalized by a DFT $P=D^H W D$, where D is the DFT matrix and W is diagonal of the form $W=\mathrm{diag}(1, W_{LF}^{-1}, \ldots, W_{LF}^{-(LF-1)})$, with $W_{LF}=e^{j(2\pi i/LF)}$. After some substitution, S may be expressed as eq 15, where the expression 15-1 denotes dimension-wise IDFT and expression 15-3 denotes dimension-wise DFT, meaning that the DFT or IDFT is applied on each of the M diversity dimensions. The central expression 15-2 is a block diagonal matrix whose diagonal blocks are the element-wise DFT of the array of matrices $E_0, \ldots, E_{LF-1}$, as expressed in eq 16, where F is an M×M matrix defined by eq 17. The inverse of S is therefore given by eq 18. The inversion of F reduces to the inversion of $L_F$ small M×M matrices, since F is block diagonal.

The procedure for multi-dimensional transmission can be summarized as:

1) Estimate the correlation matrix R from the received signal.
2) Convert to the block circulant matrix S by adding two "corners"
3) Take an "element-wise" FFT on the first "block" column of S and form F, invert and get $F^{-1}$
4) Calculate "dimension-wise" FFT of h, or $(D \otimes I)h$ and $F^{-1}(D \otimes I)h$
5) Calculate "dimension-wise" IFFT of $F^{-1}(D \otimes I)$ to get the weight vector $w=(D \otimes I)F^{-1}(D \otimes I)h$ This algorithm involves one "dimension-wise" FFT and IFFT on a vector of size $ML_F \times 1$ (equivalent to M FFT/IFFTs of length $L_F$), one "element-wise" FFT on a matrix of size M×M (which is equivalent to $M^2$ FFTs of length $L_F$) and $L_F$ matrix inversions of size M×M. The complexity of this algorithm is of the order $(L_F M^3 + (M^2 + 2M)/2 \, L_F \log 2 \, L_F)$, compared with the much higher complexity of order $(ML_F)^3$ of a direct matrix inversion of R.

Figure 6:
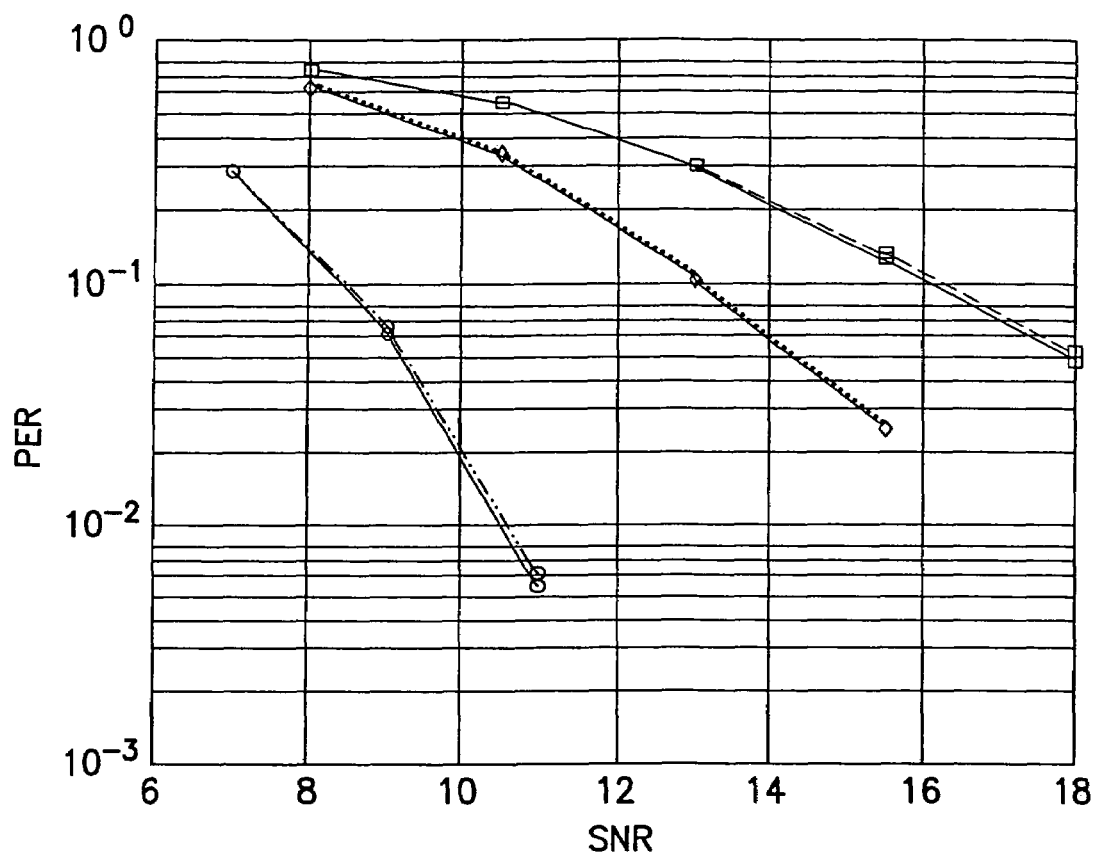
FIG. 6 shows the effect of including multi-channel diversity.

The results of a simulation using the same parameters as before, with two receive antennas and an oversampling rate of 2 is shown in FIG. 6. The improvement resulting from diversity is apparent. The curves show excellent agreement between the FFT method according to the invention and the direct matrix inversion approach.

Figure 7:
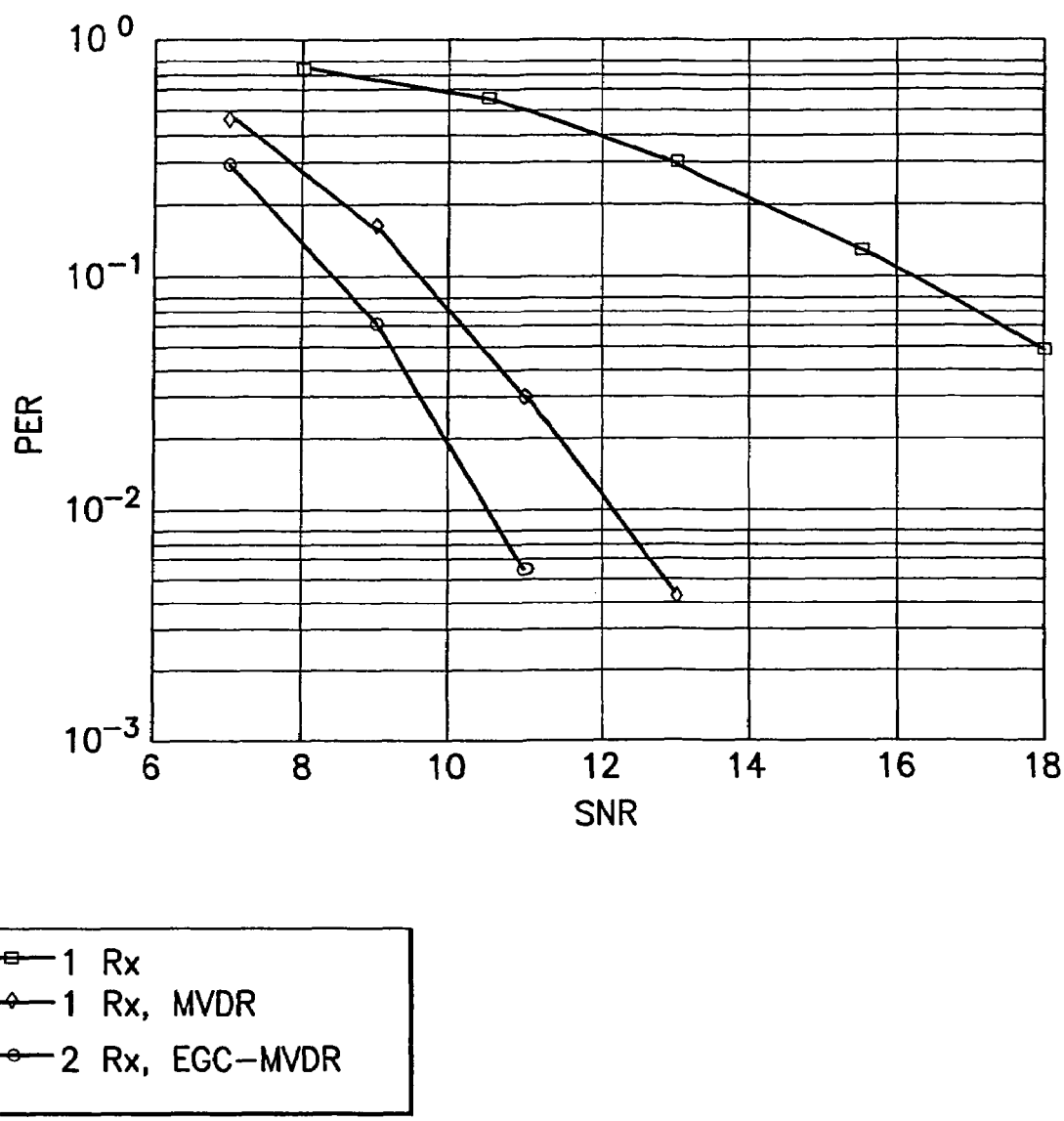
FIG. 7 shows the error rate for an alternative embodiment.

In another computational simplification, an Equal Gain Combining Minimum Variance Distortionless Response (EGC-MVDR) equalizer is obtained by neglecting the spatial correlation among different diversity branches, i.e. by setting the off-diagonal elements of the matrices E0 . . . EL to zero. In that case, the solution for w is obtained by solving a set of M decoupled problems for each diversity branch. The solutions are combined with equal weight. The results of this model with a dual antenna system are shown in FIG. 7. The improvement from the second antenna is evident.

Although the invention has been described with respect to a limited number of embodiments, those skilled in the art will appreciate that other embodiments may be constructed within the spirit and scope of the following claims.

We claim:

1. A method comprising:
receiving a spread spectrum signal;
estimating a channel coefficient vector from the received signal;
estimating a channel correlation matrix of the received signal;
converting the channel correlation matrix to a block circulant matrix;
determining a diagonal matrix from at least a portion of the block circulant matrix and at least a portion of the channel coefficient vector;
determining a filter vector from an inverse of the diagonal matrix; and
applying the filter vector to the received signal to estimate a chip of equalized data.

2. The method of claim 1 wherein converting the channel correlation matrix to the block circulant matrix comprises adding a corner matrix to the correlation matrix, wherein the corner matrix comprises a zero element at least at a first column and last row thereof.

3. The method of claim 1 further comprising adding a unit matrix multiplied by a constant to the block circulant matrix.

4. The method of claim 1 further comprising cyclically shifting the circulant matrix with a shift matrix, and wherein determining the diagonal matrix is from at least a portion of the cyclically shifted block circulant matrix.

5. The method of claim 4 wherein determining the diagonal matrix is from a first block column of the cyclically shifted block circulant matrix.

6. The method of claim 5 wherein determining the diagonal matrix comprises taking an element-wise Fourier transform of the first block column of the cyclically shifted block circulant matrix;
the method further comprising taking a dimension-wise Fourier transform of a channel matrix;
and wherein applying the filter vector to the received signal comprises multiplying the received signal by a dimension-wise inverse Fourier transform of the product of the dimension-wise Fourier transform of the channel matrix and the inverse of the diagonal matrix.

7. The method of claim 1 wherein determining the diagonal matrix from at least a portion of the block circulant matrix comprises determining the diagonal matrix from only a first column of the block circulant matrix.

8. The method of claim 1 wherein determining the diagonal matrix from at least a portion of the block circulant matrix comprises executing a Fourier transform on at least a portion of the block circulant matrix.

9. The method of claim 8 wherein the Fourier transform is a fast Fourier transform.

10. The method of claim 1 wherein determining a filter vector from an inverse of the diagonal matrix comprises multiplying a Fourier transform of the inverse of the diagonal matrix by a Fourier transform of a channel vector.

11. The method of claim 10 wherein the Fourier transform of the inverse of the diagonal matrix is an inverse Fourier transform.

12. The method of claim 1 wherein estimating a channel correlation matrix of the received signal is over more than $L_F$ chips over which at least the estimating and converting are executed, the method further comprising, prior to applying the filter vector w to the received signal, arranging the received signal in sliding windows of $L_F$ chips, where $L_F$ is a filter length.

13. The method of claim 12, wherein truncating the received signal comprises retaining only the central $L_F$ chips of the received signal.

14. The method of claim 1 applied to a series of Nx chips, where a previously presented filter vector is applied no more frequently than once every N chips, where N and x are each integers greater than one.

15. The method of claim 14 wherein N is a multiple of 1024.

16. The method of claim 1 wherein the received signal comprises data only.

17. The method of claim 16 wherein the received signal is consistent with a 1xEV-DO standard.

18. The method of claim 16 wherein the received signal comprises streaming video.

19. A device comprising:
  a channel estimator adapted to estimate at least one of a channel vector and a channel matrix of a received signal;
  a linear equalizer having an input coupled to the channel estimator and adapted to equalize the received signals over a chip, the equalizer adapted to:
  estimate a channel correlation matrix of the received signal,
  convert the channel correlation matrix to a block circulant matrix,
  determine a diagonal matrix from at least a portion of the block circulant matrix;
  determine a filter vector from an inverse of the diagonal matrix; and
  multiply the filter vector by to the received signal.

20. The device of claim 19 wherein the equalizer is adapted to convert the channel correlation matrix to a block circulant matrix by adding a corner matrix to the correlation matrix, the corner matrix comprising a zero element at least at a first column and last row thereof.

21. The device of claim 19 wherein the equalizer is further adapted to add a unit matrix multiplied by a constant to the block circulant matrix.

22. The device of claim 19 wherein the equalizer is further adapted cyclically shift the circulant matrix with a shift matrix, and to determine a diagonal matrix from at least a portion of the cyclically shifted block circulant matrix.

23. The device receiver of claim 22 wherein the equalizer is adapted to determine the diagonal matrix from a first block column of the cyclically shifted block circulant matrix.

24. The device of claim 23 wherein the equalizer is adapted to determine the diagonal matrix by taking an element-wise Fourier transform of the first block column of the cyclically shifted block circulant matrix;
  the equalizer is further adapted to take a dimension-wise Fourier transform of the channel matrix;
  and the equalizer is adapted to multiply the filter vector by the received signal by multiplying the received signal by a dimension-wise inverse Fourier transform of the product of the dimension-wise Fourier transform of the channel matrix and the inverse of the diagonal matrix.

25. The device of claim 19 wherein the equalizer is adapted to determine determine the diagonal matrix from only a first column of the block circulant matrix.

26. The device of claim 19 wherein the equalizer is adapted to determine the diagonal matrix by executing a Fourier transform on at least a portion of the block circulant matrix.

27. The device of claim 19 wherein the equalizer is adapted to determine a filter vector by multiplying a Fourier transform of the inverse of the diagonal matrix by a Fourier transform of the channel vector.

28. The device of claim 27 wherein the Fourier transform of the inverse of the diagonal matrix is an inverse Fourier transform.

29. The device of claim 19 wherein the equalizer is adapted to estimate a channel correlation matrix of the received signal over more than $L_F$ chips, and to truncate the received signal to only $L_F$ chips prior to multiplying the filter vector by the received signal, where $L_F$ is a filter length.

30. The device of claim 29, wherein the equalizer is adapted to truncate the received signal by retaining only the central $L_F$ chips of the received signal.

31. The device of claim 19 wherein the equalizer is adapted to estimate, convert, and determine only once per N chips, where N is greater than one.

32. The device of claim 31 wherein N is a multiple of 1024.

33. The device of claim 19 wherein the received signal comprises data only.

34. The device of claim 33 wherein the received signal is consistent with a 1xEV-DO standard.

35. The device of claim 33 wherein the received signal comprises streaming video.

36. The device of claim 19 wherein the device comprises a receiver disposed within a mobile station.

37. A program of machine-readable instructions, tangibly embodied on an information bearing medium and executable by a digital data processor, to perform actions directed toward equalizing a spread spectrum signal, the actions comprising:
  estimating a channel correlation matrix of a received signal;
  converting the channel correlation matrix to a block circulant matrix;
  determining a diagonal matrix from at least a portion of the block circulant matrix;
  determining a filter vector from an inverse of the diagonal matrix; and
  applying the filter vector to the received signal to estimate a chip of equalized data.

38. The program of machine readable instructions of claim 37, further comprising means to count chips of the received signal and to apply a previously presented filter vector after N chips, where N is an integer of the order $2^X$ and x is an integer.

39. A device comprising:
means for estimating a channel correlation matrix of the a received spread spectrum signal;
means for converting the channel correlation matrix to a block circulant matrix;
means for determining a diagonal matrix from at least a portion of the block circulant matrix;
means for determining a filter vector from an inverse of the diagonal matrix; and
means for applying the filter vector to the received signal to estimate a chip of equalized data.

40. The device of claim 39 wherein at least some of the means are embodied in circuitry and at least some of the means are embodied in software stored in a tangible computer-readable medium.

* * * * *